United States Patent
Zhao

(10) Patent No.: US 9,733,095 B2
(45) Date of Patent: Aug. 15, 2017

(54) NAVIGATION SYSTEM WITH GUIDANCE DELIVERY MECHANISM AND METHOD OF OPERATION THEREOF

(71) Applicant: Telenav, Inc., Sunnyvale, CA (US)

(72) Inventor: Dongheng Zhao, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 90 days.

(21) Appl. No.: 14/047,250

(22) Filed: Oct. 7, 2013

(65) Prior Publication Data

US 2015/0100229 A1 Apr. 9, 2015

(51) Int. Cl.
*G01C 21/34* (2006.01)
*G01C 21/20* (2006.01)

(52) U.S. Cl.
CPC .............. *G01C 21/34* (2013.01); *G01C 21/20* (2013.01)

(58) Field of Classification Search
CPC .. G01C 21/34; G01C 21/20; G08G 1/096822; G08G 1/096741
USPC ........................................................ 701/400
See application file for complete search history.

(56) References Cited

U.S. PATENT DOCUMENTS

| | | | |
|---|---|---|---|
| 6,978,206 B1* | 12/2005 | Pu et al. ..................... 701/446 |
| 7,348,921 B2* | 3/2008 | Yu .............................. 342/357.63 |
| 2002/0103597 A1* | 8/2002 | Takayama et al. ........... 701/200 |
| 2005/0015197 A1* | 1/2005 | Ohtsuji et al. ................ 701/202 |
| 2006/0149463 A1* | 7/2006 | Machii et al. ................ 701/209 |
| 2007/0052552 A1* | 3/2007 | Suzuki ......................... 340/905 |
| 2008/0037956 A1* | 2/2008 | Nallur et al. ................. 386/112 |
| 2013/0116919 A1* | 5/2013 | Furuhata et al. ............. 701/408 |
| 2014/0257695 A1* | 9/2014 | Annapureddy et al. ...... 701/537 |
| 2014/0309982 A1* | 10/2014 | Ricci ................................ 704/3 |

OTHER PUBLICATIONS

Wilson Electronics, Inc., 2011 Product Catalogue (2011) (Enitre Document).*

* cited by examiner

*Primary Examiner* — Courtney Heinle
(74) *Attorney, Agent, or Firm* — IP Investment Law Group

(57) ABSTRACT

A method of operation of a navigation system includes: receiving a navigation request for reaching a destination; generating a navigation information based on the navigation request; generating an information segment from the navigation information; and generating a transmission sequence for prioritizing an information type of the information segment for displaying the information segment on a device.

20 Claims, 8 Drawing Sheets

NAVIGATION SYSTEM WITH GUIDANCE DELIVERY MECHANISM AND METHOD OF OPERATION THEREOF

TECHNICAL FIELD

The present invention relates generally to a navigation system, and more particularly to a system for guidance delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without guidance delivery mechanism has become a paramount concern for the consumer. The inability decreases the benefit of using the tool.

Thus, a need still remains for a navigation system with guidance delivery mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a navigation request for reaching a destination; generating a navigation information based on the navigation request; generating an information segment from the navigation information; and generating a transmission sequence for prioritizing an information type of the information segment for displaying the information segment on a device.

The present invention provides a navigation system, including: a control unit for: receiving a navigation request for reaching a destination, generating a navigation information based on the navigation request, generating an information segment from the navigation information, generating a transmission sequence for prioritizing an information type of the information segment, and a communication unit, coupled to the control unit, for communicating the information segment in accordance with the transmission sequence for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
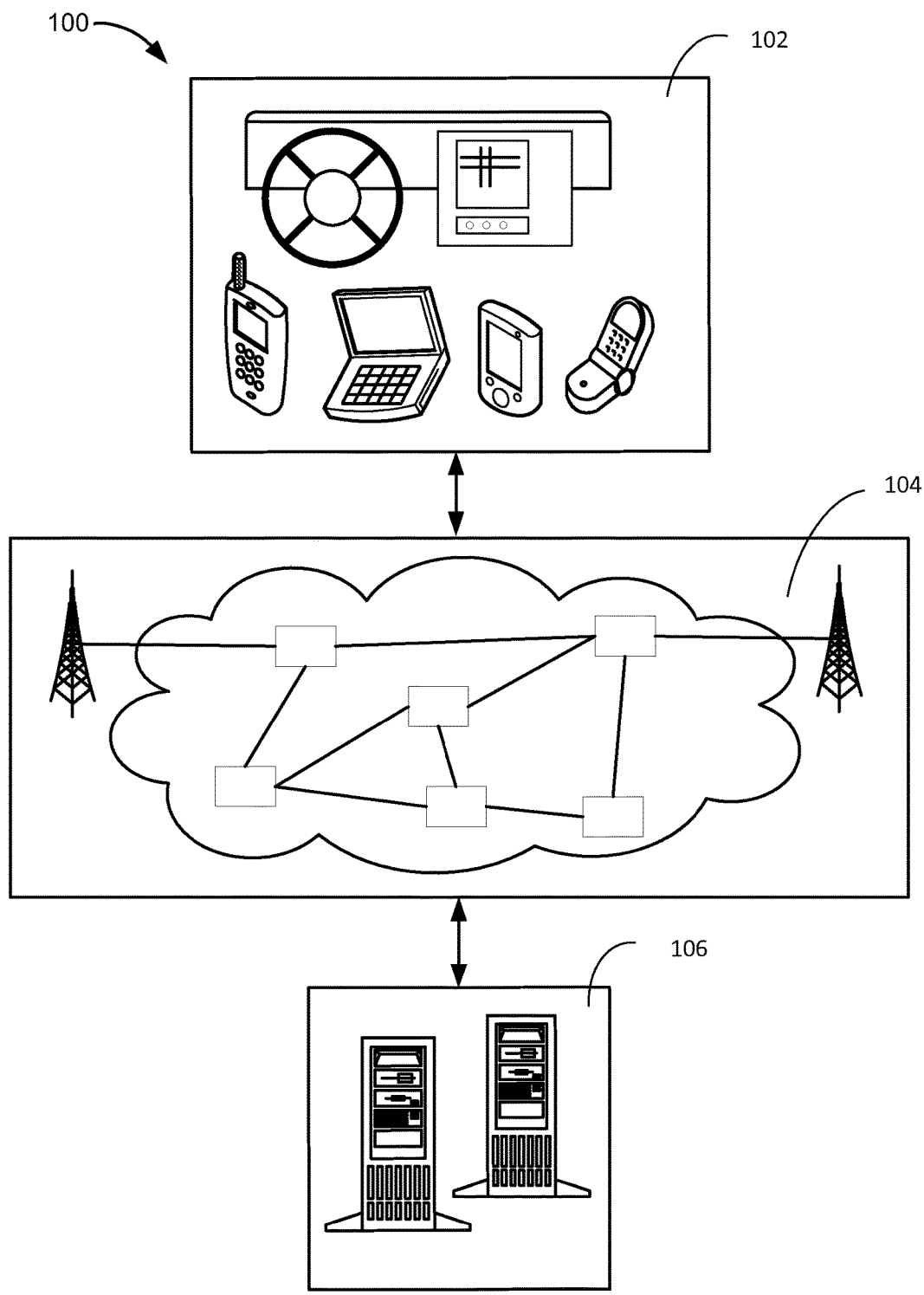
FIG. 1 is a navigation system with guidance mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with guidance delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
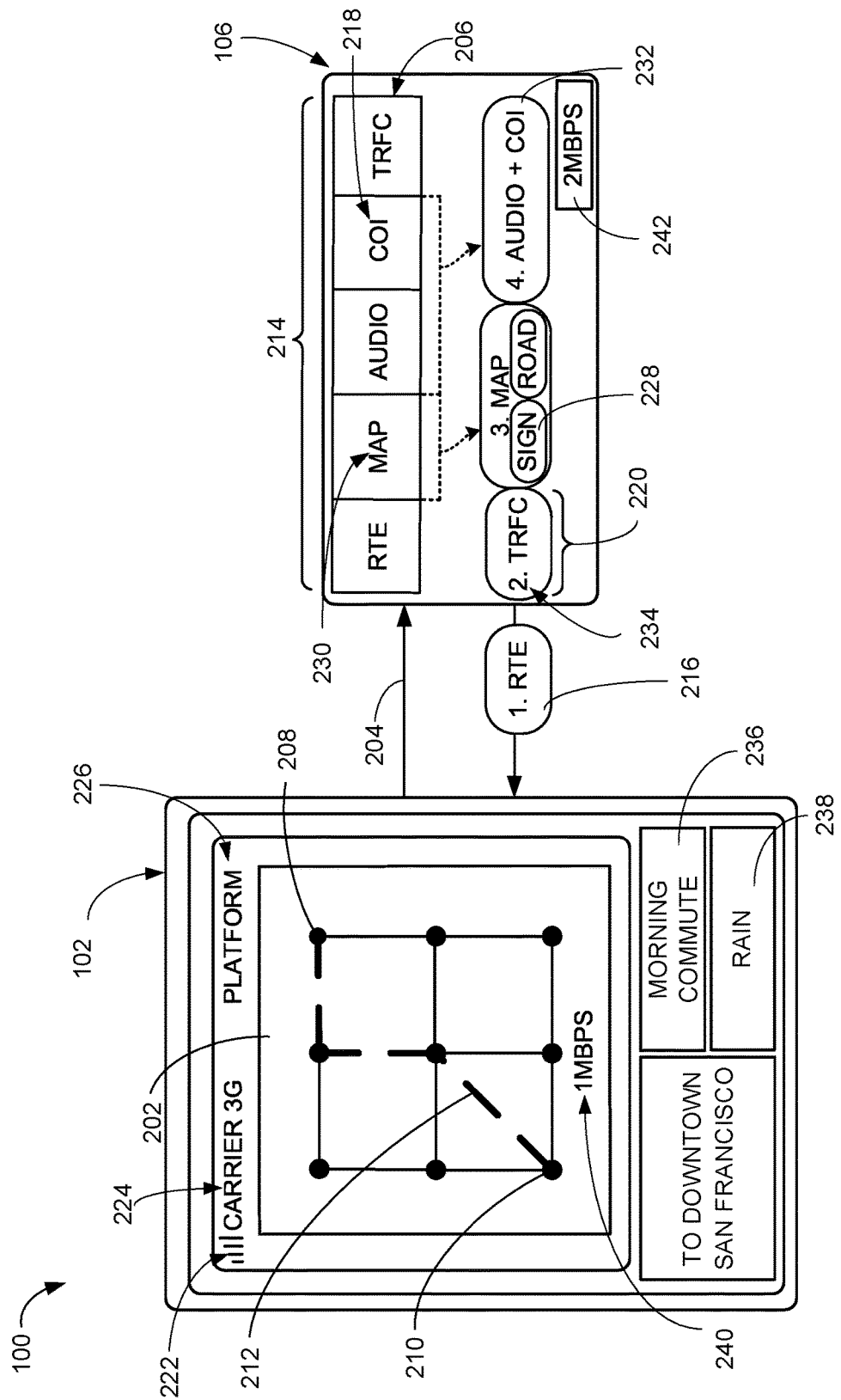
FIG. 2 is an example of the first device interacting with the second device for sending a navigation request to the second device.

Referring now to FIG. 2, therein is shown an example of the first device 102 interacting with the second device 106 for sending a navigation request 204 to the second device 106. For clarity and brevity, the discussion of the present invention will focus on the first device 102 displaying the result generated by the navigation system 100. However, the second device 106 and the first device 102 can be discussed interchangeably.

The first device 102 can send the navigation request 204 to the second device 106. The navigation request 204 is defined as an entry by the user of the first device 102, the navigation system 100, or a combination thereof to request the second device 106 to generate navigation information 206 for reaching a destination 208. For example, the navigation request 204 can be "to downtown San Francisco, Calif. (CA)" from a current location 210.

The navigation information 206 is defined as a navigation guidance generated by the navigation system 100 to aid the user of the first device 102 to reach the destination 208. For example, the navigation information 206 can include a travel route 212, map information, an audio guidance, or a combination thereof. The destination 208 is defined as the target geographic location at the end of the travel route 212. The current location 210 is defined as the current geographic location of the first device 102. The travel route 212 is defined as the pathway generated by the navigation system 100 to guide the user of the first device 102 to reach the destination 208.

The navigation information 206 can include an information size 214, which is defined as an amount of data of the navigation information 206. For example, the information size 214 can be represented by the number of bytes. For another example, the information size 214 can represent an indexed range between a zero-based indexing to n-based indexing of an array data structure. More specifically, an array data structure can represent a collection of data objects. The array data structure can be indexed to indicate the position where the data object is stored in the array. The first position of the array can represent the zero base index. And the array can be indexed up to n-base indexing based on n-th position of the array.

The navigation information 206 can include an information segment 216, which is defined as a portion of the navigation information 206 segmented by the navigation system 100. For example, the information segment 216 can include a route portion, a portion representing a category of interest 218, a map information portion, an audio portion, a traffic information portion, or a combination thereof. For further example, the information segment 216 can represent a chunk of data for chunked transfer encoding of the Hypertext Transfer Protocol (HTTP). The category of interest 218 is defined as a broad breadth of interests by the user of the first device 102, such as coffee, restaurant, refueling station, or gym.

A representation example of the navigation information 206 after being chunked to generate the information segment 216 can be illustrated with the dotted lines connecting from the navigation information 206 to the information segment 216. For example, the navigation information 206 can include the map information. The map information portion of the navigation information 206 can be chunked to generate the information segment 216 representing the map information.

The information segment 216 can include a segment size 220, which is defined as an amount of data for the information segment 216. For example, the segment size 220 can be represented by the number of bytes. For another example, the segment size 220 can represent an indexed range between a zero-based indexing to n-based indexing of the array data structure.

The segment size 220 can be changed based on a network quality 222, a carrier type 224, a platform type 226, the information size 214, or a combination thereof. Details regarding the network quality 222, the carrier type 224, the platform type 226, the information size 214, or a combination thereof influencing the segment size 220 will be discussed later.

The information segment 216 can include a subsegment 228, which is defined as a portion of the information segment 216 segmented by the navigation system 100. For example, the information segment 216 can represent the map information portion of the navigation information 206. The map information portion can include a plurality of the subsegment 228 representing a sign portion, a road portion, or a combination thereof. The sign portion can include the navigation information 206 related to street names. The road portion can include the navigation information 206 related to freeways and local loads for a geographic area of the current location 210. A size of the subsegment 228 can change based on the similar factor as discussed for the segment size 220 above.

The information segment 216 can include an information type 230, which is defined as a category of the navigation information 206. For example, the information type 230 can include route information, map information, audio information, the category of interest information, or a combination thereof. More specifically, the information segment 216 having the data for the travel route 212 can represent the information type 230 of the route information.

A display interface 202 of the first device 102 can display the information segment 216 each individual type of the information type 230 separately. For example, the display interface 202 can display the information segment 216 with the information type 230 of the route information. More specifically, the display interface 202 can display the travel route 212 without the map information or the audio information.

A plurality of the information segment 216 can be combined to form a segment combination 232. For example, the segment combination 232 can include a combination of the information type 230 of the route information and the audio information. More specifically, the audio information can overlay the route information as the segment combination 232. The navigation system 100 can transmit the segment combination 232 to the first device 102 rather than sending each of the information segment 216 to the first device 102. As a result, the first device 102 can display the route information on the display interface 202 with the audio information providing audio guidance to the user simultaneously.

The navigation system 100 can generate a transmission sequence 234, which is defined as an arrangement of the information segment 216. Based on the transmission sequence 234, the navigation system 100 can send the navigation information 206 to the first device 102.

For example, the transmission sequence 234 can include a plurality of the information segment 216 with a plurality of the information type 230. For further example, the navigation system 100 can transmit the navigation information 206 to the first device 102 based on the transmission sequence 234 by transmitting the information segment 216 in a following order: 1. Route information; 2 Traffic information; 3. Map information; 4. Audio information; and 5. Category of interest information. The transmission sequence 234 can be rearranged based on a user's preference 236, a travel condition 238, or a combination thereof. Details regarding a rearrangement of the transmission sequence 234 will be discussed later.

For example, the user's preference 236 can be prioritizing a transmission of the information segment 216 with the information type 230 of the traffic information to the first device 102 during the hours of morning commute. For another example, the user's preference 236 can be prioritizing the transmission of the information segment 216 with the information type 230 of the category of interest information to the first device 102 during the weekend.

The travel condition 238 is defined as a circumstance that can exist at the time when the user of first device 102 is traveling, plan to travel, or a combination thereof. For example, the travel condition 238 can be rainy weather when the user of the first device 102 is commuting to work. For another example, the navigation system 100 can factor in the Independence Day festivity as the travel condition 238 for traveling during over the weekend.

The network quality 222 is defined as a quality of the communication path 104. For example, the network quality 222 can include strength or coverage of telecommunication service available within a geographic region. For another example, to determine the network quality 222, the navigation system 100 can consider an availability of a network type, a transmission mode, a transmission speed 240, or a combination thereof. For different example, the network quality 222 can include a bandwidth of the communication path 104.

The carrier type 224 is defined as a type of a telecommunication service operating with the first device 102 over the communication path 104. For example, the carrier type 224 can include AT&T™, Verizon™, or Sprint™, which they are telecommunication companies that provide mobile telecommunication services in the United States. For further example, the carrier type 224 can be represented as Carrier A or Carrier B.

The platform type 226 is defined as a type of the first device 102. For example, the platform type 226 of the first device 102 used by the user can be an iPhone™ with iOS™ operating system. For different example, the platform type 226 can be Samsung Galaxy™ with Android™ operating system. For further example, the platform type 226 of the first device 102 can be represented as Platform A or Platform B.

The navigation system 100 can consider the transmission speed 240 to determine the network quality 222. For example, the transmission speed 240 can include a rate of data transfer between the second device 106 and the first device 102. For specific example, the transmission speed 240 for transmitting the information segment 216 representing the route information can be 1 megabit per second (Mbps). Further, the navigation system 100 can consider the transmission speed 240 permitted by the carrier type 224, the platform type 226, or a combination thereof. Details regarding the consideration will be discussed later.

The navigation system 100 can consider a quality threshold 242 to determine the network quality 222. For example, the quality threshold 242 can represent the minimum level of decibel for signal-to-noise ratio (SNR), delay time, the transmission speed 240, amplitude, signal power unit in watts, or a combination thereof for transmitting a signal. For specific example, the navigation system 100 can segment the navigation information 206 to generate the information segment 216 if the decibel level of the wireless signal from the cell tower dips below the quality threshold 242. For another example, the navigation system 100 can segment the navigation information 206 to generate the information segment 216 if the delay time of receiving the wireless signal exceeds the quality threshold 242.

Figure 3:
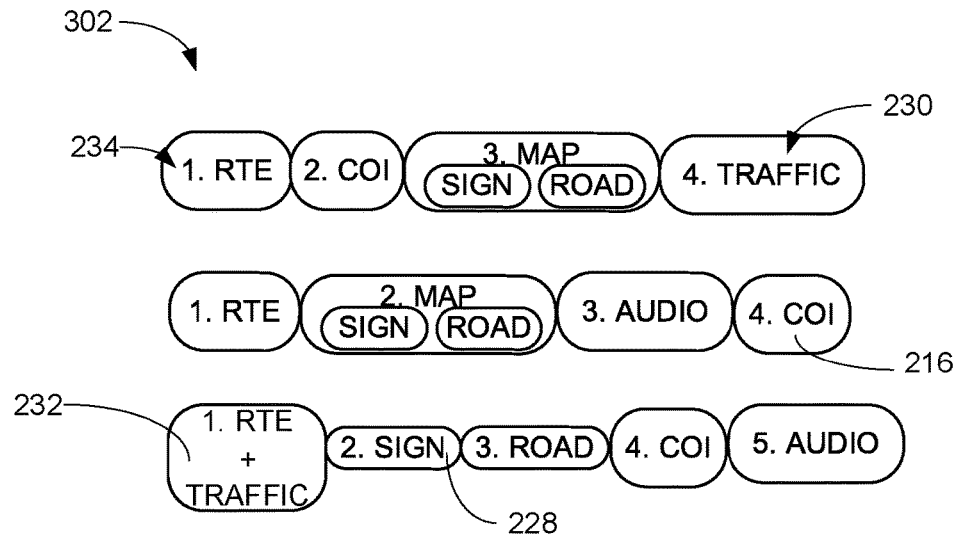
FIG. 3 is an example of a variation of the transmission sequence.

Referring now to FIG. 3, therein is shown an example of a variation 302 of the transmission sequence 234. The variation 302 is defined as a rearrangement of the transmission sequence 234 based on various factors. For example, the variation 302 of the transmission sequence 234 can include the order of transmitting the route information first, followed by the transmission of the category of interest information, the map information, and the audio information to the first device 102 of FIG. 1.

For different example, the variation 302 of the transmission sequence 234 can include only transmitting the information type 230 of the route information and the traffic information. For another example, the variation 302 of the transmission sequence 234 can include a combination of the information segment 216 and the subsegment 228, the subsegment 228 sent individually along with the information segment 216 to the first device 102.

For different example, the variation 302 of the transmission sequence 234 can include the segment combination 232 including the route information and traffic information being transmitted before the information type 230 of the audio information. Details regarding the navigation system 100 generating the variation 302 of the transmission sequence 234 will be discussed later.

Figure 4:
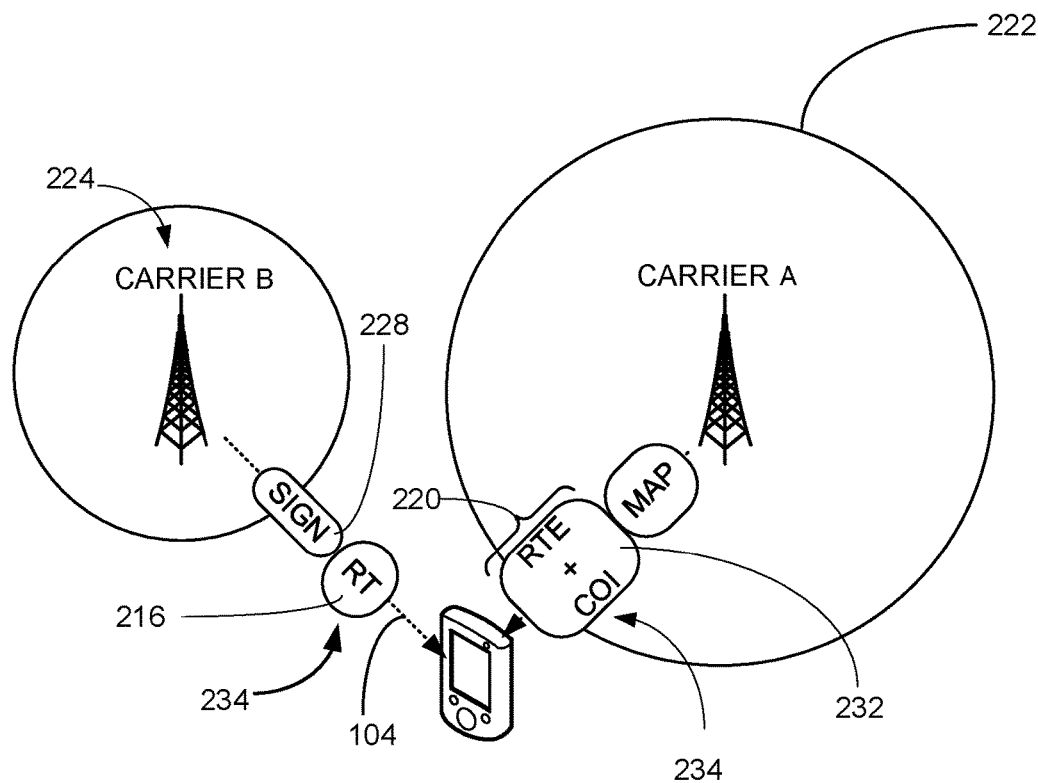
FIG. 4 is an example of the network quality, the carrier type, the platform type, or a combination thereof impacting a generation of the transmission sequence for transmitting the information segment.

Referring now to FIG. 4, therein is shown an example of the network quality 222, the carrier type 224, the platform type 226 of FIG. 2, or a combination thereof impacting a generation of the transmission sequence 234 for transmitting the information segment 216. For example, the variation 302 of the transmission sequence 234 can be generated based on the network quality 222, the carrier type 224, the platform type 226, or a combination thereof.

For specific example, the carrier type 224 can be Carrier A. Carrier A can offer the network quality 222 that is better than another of the carrier type 224 of Carrier B. More specifically, the transmission speed 240 of FIG. 2 can be better with Carrier A than Carrier B. The user of the first device 102 can subscribe to Carrier A for mobile phone service. The navigation system 100 can transmit one instance of the information segment 216 with the transmission sequence 234 that includes the route information and the category of interest information to the first device 102. In contrast, if the user of the first device 102 subscribes to Carrier B, the navigation system 100 can transmit with the transmission sequence 234 that includes different instance of the information segment 216, with the route information and without the category of interest information, and the subsegment 228 to reduce the burden for transmitting a large size data over the communication path 104.

For further example, the variation 302 of FIG. 3 of the transmission sequence 234 can be based on the information size 214 of FIG. 2 of the navigation information 206 of FIG. 2, the segment size 220 of the information segment 216, or a combination thereof. As discussed previously, Carrier A can offer the network quality 222 that is better than Carrier B. The data size of the segment combination 232 that includes the route information and the category of interest information can be larger than the information segment 216 representing the route information.

Continuing with the example, the navigation system 100 can transmit the segment combination 232 with the route information and the category of interest information over the communication path 104 offered by Carrier A because of the network quality 222 offered by Carrier A. In contrast, the navigation system 100 can transmit with the transmission sequence 234 that includes the information segment 216 of the route information and the subsegment 228 of sign information only. The navigation system 100 can determine not to send the segment combination 232 with the route information and the category of interest information over the communication path 104 offered by Carrier B to minimize the burden on the communication path 104.

For another example, the navigation system 100 can change the transmission sequence 234 based on the network quality 222. More specifically, the navigation system 100 can change the segment size 220 based on whether the strength of the wireless is meeting or exceeding the quality threshold 242 of FIG. 2. For different example, the navigation system 100 can change the variation 302 of the transmission sequence 234 based on the capability of the platform type 226 for accepting the information segment 216. More specifically, if an interference level that causes a delay for receiving the wireless signal exceeds the quality threshold 242, the navigation system 100 can send only the subsegment 228 to reduce the delay time. Details will be discussed later.

Figure 5:
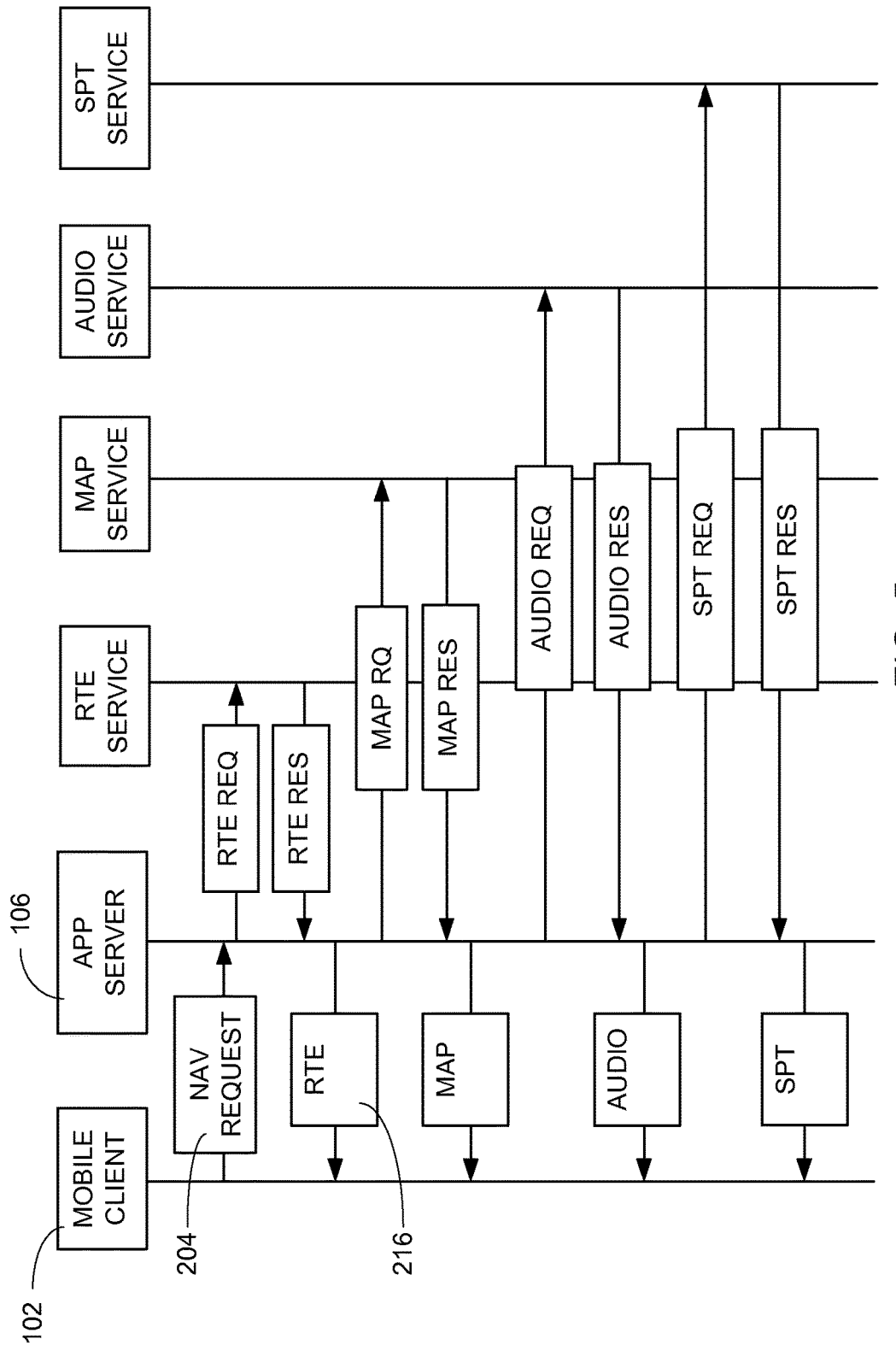
FIG. 5 is a first example of a sequence diagram.

Referring now to FIG. 5, therein is shown a first example of a sequence diagram. More specifically, the sequence diagram can illustrate the interaction between the first device 102 and the second device 106.

For example, the first device 102 can transmit the navigation request 204. The navigation request 204 can be partitioned by the second device 106 to interact with variety of services available in the second device 106. For example, the second device 106 can include the route service to generate the information segment 216 representing the route information.

For further example, the second device 106 can interact with the variety of services in accordance to the transmission sequence 234 of FIG. 2. More specifically, the transmission sequence 234 can represent: 1. Route information; 2 Map information; 3. Audio information; and 4. Shortest Path Tree (SPT) information. Based on the transmission sequence 234, the second device 106 can interact with the route service first to generate the information segment 216 representing the route information. Next, the second device 106 can interact with the map service to generate the information segment 216 representing the map information. SPT can represent a path, generated based on Dijkstra Algorithm, that has a shortest physical distance between one node to another node. The node can represent a decision point where the navigation system 100 can decide how to proceed with the travel.

In response to the navigation request 204, the second device 106 can transmit the plurality of the information segment 216 in the order based on the transmission sequence 234. More specifically, the first device 102 can receive the plurality of the information segment 216 based on the transmission sequence 234 of: 1. Route information; 2 Map information; 3. Audio information; and 4. SPT information.

Figure 6:
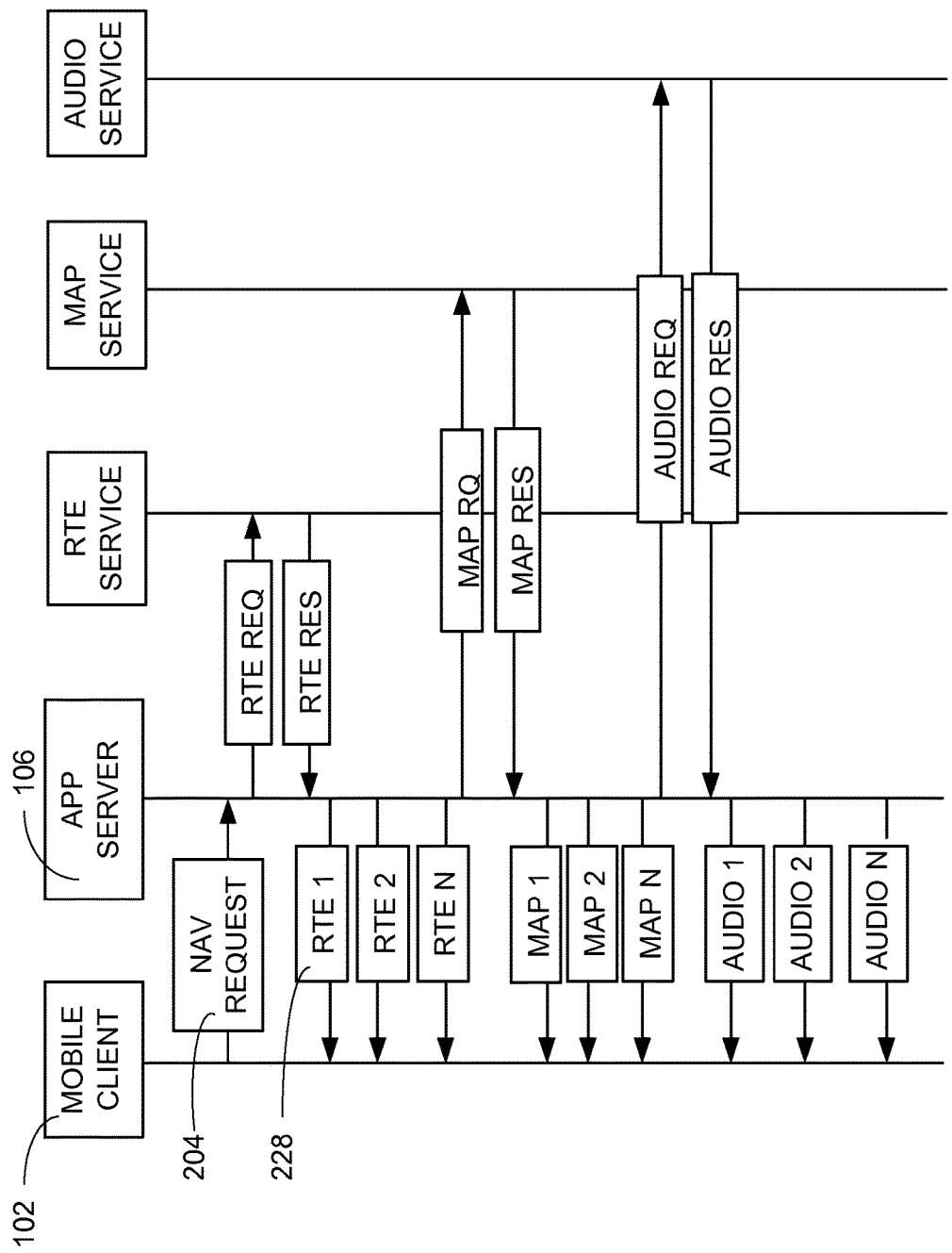
FIG. 6 is a second example of the sequence diagram.

Referring now to FIG. 6, therein is shown a second example of the sequence diagram. More specifically, the sequence diagram can illustrate the interaction between the first device 102 and the second device 106 for transmitting the subsegment 228. As discussed in FIG. 5, after the second device 106 received the navigation request 204, the second device 106 can generate the subsegment 228 to be displayed on the first device 102. More specifically, the subsegment 228 can be transmitted to the first device 102 based on the transmission sequence 234.

For further example, the subsegment 228 can be generated from the information segment 216 of FIG. 2 representing the map information. "MAP 1" can represent the subsegment 228 representing the sign portion of the map information. "MAP 2" can represent the subsegment 228 representing the road portion. "MAP N" can represent the n-th number of the subsegment 228. The n-th number of the subsegment 228 can be generated based on the partitioning of the information segment 216.

Figure 7:
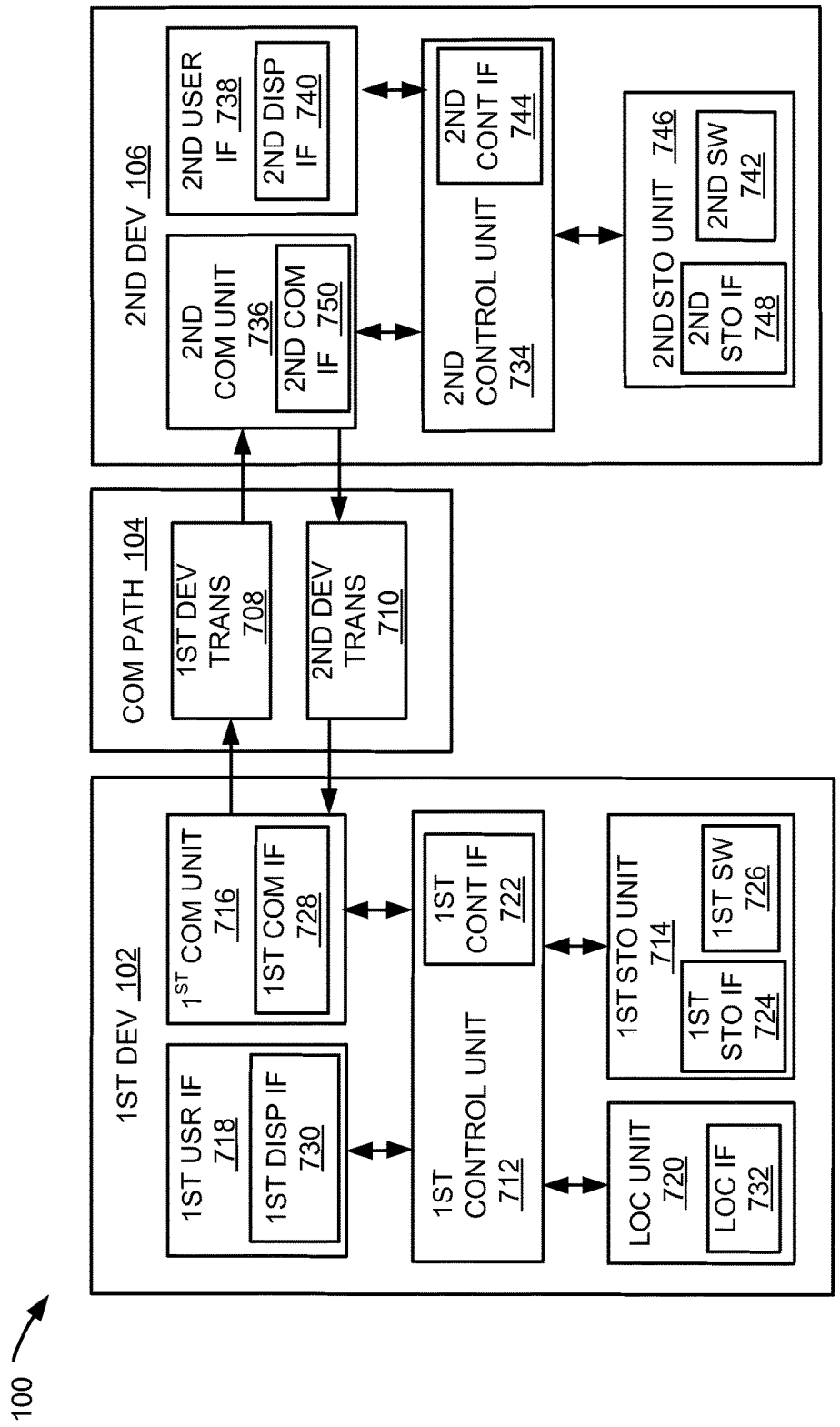
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate to the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second control interface 744. The second control interface 744 can be used for communication between the second control unit 734 and other functional units in the second device 106. The second control interface 744 can also be used for communication that is external to the second device 106.

The second control interface 744 can receive information from the other functional units or from external sources, or can transmit information to the other functional units or to external destinations. The external sources and the external destinations refer to sources and destinations physically separate to the second device 106.

The second control interface 744 can be implemented in different ways and can include different implementations depending on which functional units or external units are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate to the second device 106.

The second storage interface 748 can include different implementations depending on which functional units or external units are being interfaced with the second storage unit 746. The second storage interface 748 can be implemented with technologies and techniques similar to the implementation of the second control interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second control interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
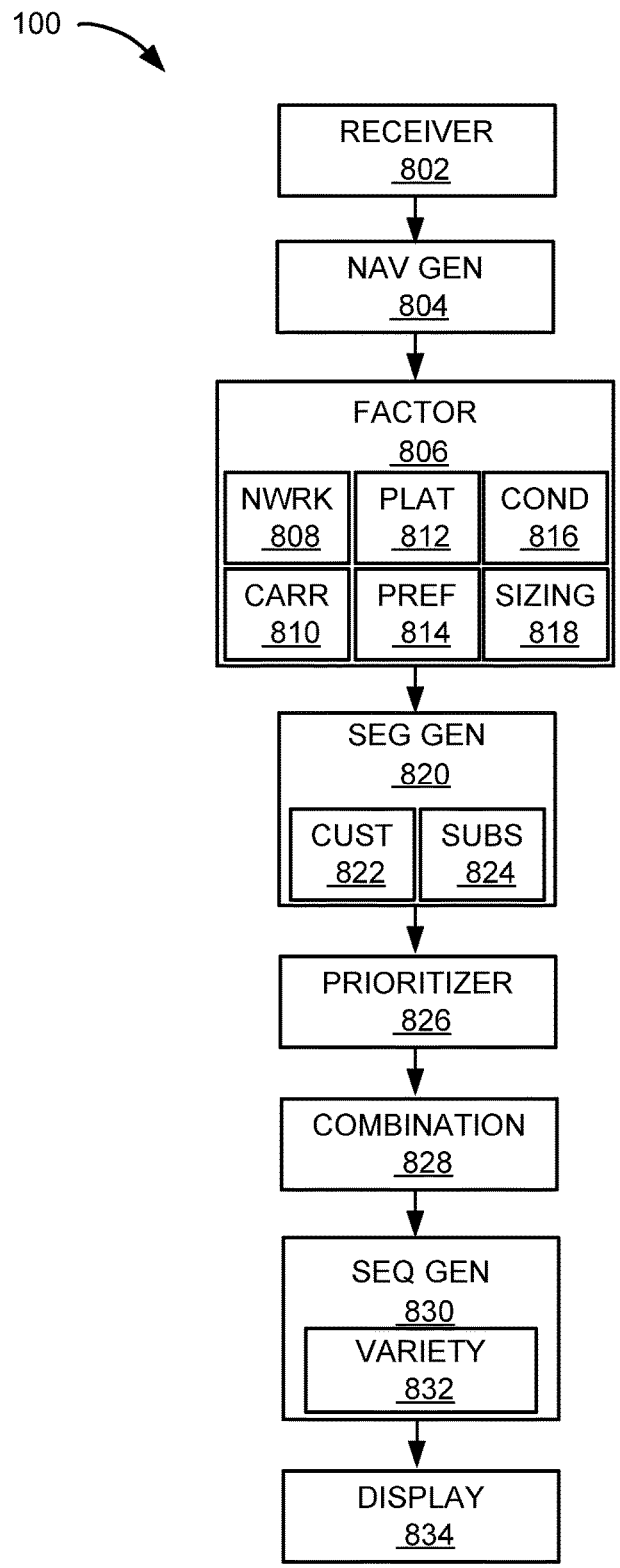
FIG. 8 is a control flow of the navigation system.

Referring now to FIG. 8, therein is shown a control flow of the navigation system 100. The navigation system 100 can include a receiver module 802. The receiver module 802 receives the navigation request 204 of FIG. 2. For example, the receiver module 802 can receive the navigation request 204 for reaching the destination 208 of FIG. 2.

The navigation system 100 can include a navigation generator module 804, which can be coupled to the receiver module 802. The navigation generator module 804 generates the navigation information 206 of FIG. 2. For example, the navigation generator module 804 can generate the navigation information 206 based on the navigation request 204.

For example, the navigation request 204 can include a request for the travel route 212 of FIG. 2 to reach the destination 208 from the current location 210 of FIG. 2. The current location 210 can represent Sunnyvale, Calif. The destination 208 can represent Sausalito, Calif. The navigation generator module 804 can generate the navigation information 206 with the travel route 212 from Sunnyvale, Calif. to Sausalito, Calif.

Further, the navigation information 206 can include the map information and the audio information that complement the route information representing the travel route 212. For specific example, the map information can represent a map for the geographic region where the travel route 212 traverses through. More specifically, the map information can include the street names and topographic image of the geographic region. And the audio information can include the audio turn-by-turn guidance to aid the user of the first device 102 to traverse the travel route 212.

The navigation system 100 can include a factor module 806, which can be coupled to the navigation generator module 804. The factor module 806 determines the factors that influences the generation of the information segment 216 of FIG. 2. For example, the factor module 806 can determine the information size 214 of FIG. 2 of the navigation information 206.

The factor module 806 can determine the factors in a number of ways. For example, the factor module 806 includes a network module 808. The network module 808 can determine the network quality 222 of FIG. 2.

The network module 808 can determine the network quality 222 in a number of ways. For example, the network module 808 can determine the network quality 222 based on determining the transmission speed 240 of FIG. 2 of the communication path 104 of FIG. 1. More specifically, the network module 808 can send a test request file to fetch a test response file with a minimal data size (for example, 1 kilobyte) via the first control interface 722 of FIG. 7 to the second device 106 of FIG. 2. The network module 808 can send the test file on a set interval (for example, every 30 seconds). The network module 808 can determine the transmission speed 240 based on calculating an average time between sending the test request file and receiving the test response file. Further, the network module 808 can calculate the average time starting from every top of the hour for five minutes.

For another example, the network module 808 can send a PING command to the second device 106 to determine the network quality 222. More specifically, the network module 808 can determine the transmission speed 240 based on an average approximated round trip time for the packet sent from the first device 102 to the second device 106.

For different example, the network module 808 can determine the network quality 222 based on whether the strength of the wireless signal meets or exceeds the quality threshold 242 of FIG. 2. The decibel level of the wireless signal can differ based on how far the first device 102 is in relation to the cell tower transmitting the wireless signal. The network module 808 can receive the wireless signal via the first communication unit 716 of FIG. 7. The network module 808 can determine the network quality 222 based on whether the decibel level of the wireless signal meets or exceeds the quality threshold 242.

The factor module 806 includes a carrier module 810. The carrier module 810 can determine a type of wireless service offered by the telecommunication company. More specifically, the carrier module 810 can determine the type of wireless service based on the carrier type 224 of FIG. 2. For specific example, the carrier module 810, via the first communication unit 716, can determine the reference signal transmitted by the cell tower as a 3G network, 4G Long Term Evolution (LTE) network, or a combination thereof. If the carrier type 224 is AT&T™, and AT&T™ offers the 4G LTE network, the carrier module 810 can determine the wireless service offered by the carrier type 224 of AT&T™ to be the 4G LTE network.

The factor module 806 includes a platform module 812. The platform module 812 can determine the amount of data that the platform type 226 of FIG. 2 can receive from the second device 106. More specifically, each of the platform type 226 can have a determined amount of capacity for the first storage interface 724 of FIG. 7 to receive the navigation information 206. The size of the first storage interface 724 can differ based on the platform type 226. The platform module 812 can determine the amount of data that the platform type 226 can handle based on the first storage interface 724.

The factor module 806 includes a preference module 814. The preference module 814 can determine the user's preference 236 of FIG. 2. For example, the user's preference 236 can include the user's desire for the first device 102 to display information type 230 of FIG. 2 of the traffic information for the morning commute. For another example, the user's preference 236 can include the user's desire for the first device 102 to display the category of interest 218 related to happy hour information for Friday nights. The preference module 814 can determine the user's preference 236 based on a past activity of the user of the first device 102. More specifically, the category of interest 218 for the destination 208 visited by the user on a Friday night can be steakhouses. The preference module 814 can determine that the user's preference 236 for Friday nights to be eating steak on Friday nights.

The factor module 806 includes a condition module 816. The condition module 816 can determine the travel condition 238 of FIG. 2. For example, the condition module 816 can determine the travel condition 238 for the morning commute to be heavy traffic on Interstate 880, a highway in CA based on past historical traffic information. The traffic information can be obtained from the external sources via the first control interface 722.

The factor module 806 includes a sizing module 818. The sizing module 818 can determine the information size 214 of the navigation information 206. The sizing module 818 can determine the information size 214 in a number of ways. For example, the sizing module 818 can determine the information size 214 based on the byte size of the navigation information 206. For different example, the sizing module 818 can determine the information size 214 based the number of indexes for the array data structure representing the navigation information 206.

The navigation system 100 can include a segment generator module 820, which can be coupled to the factor module 806. The segment generator module 820 generates the information segment 216. For example, the segment generator module 820 can generate the information segment 216 based on segmenting the navigation information 206.

The segment generator module 820 can generate the information segment 216 in a number of ways. For example, the segment generator module 820 can generate the information segment 216 based on the information type 230. For specific example, the navigation information 206 can include the route information, the map information, the audio information, the category of interest information, or a combination thereof. The segment generator module 820 can generate the information segment 216 based on segmenting the navigation information 206 for each of the information type 230.

The segment generator module 820 includes a customization module 822. The customization module 822 customizes the segment size 220 of the information segment 216. For example, the customization module 822 can customize the segment size 220 based on the network quality 222 for improving the transmission speed 240 of the information segment 216 to the first device 102.

The customization module 822 can increase or decrease the segment size 220 for customizing the segment size 220. More specifically, the information type 230 of the information segment 216 can represent the map information. For example, the map information can have the segment size 220 of 10 megabytes. The customization module 822 can decrease the segment size 220 of the information segment 216 by splitting the map information to two portions of 7 megabytes each.

For specific example, the customization module 822 can increase or decrease the segment size 220 based on the network quality 222 meeting, exceeding, or dipping below the quality threshold 242. More specifically, if a wireless signal power is less than the quality threshold 242, the customization module 822 can generate the information segment 216 by segmenting the navigation information 206 with smaller of the segment size 220 than if the wireless single power had met or was greater than the quality threshold 242.

It has been discovered that the navigation system 100 reduces a transaction time for displaying the information segment 216 on the display interface 202 by factoring the network quality 222. The segment size 220 can be reduced if the network quality 222 dips below the quality threshold 242. Subsequently, the burden on the communication path 104 for transmitting the information segment 216 can be reduced. As a result, the first device 102 can display the information segment 216 more quickly and efficiently for safer operation of the navigation system 100 or the vehicle.

For different example, the customization module 822 can customize the segment size 220 based on the carrier type 224 for improving the transmission speed 240 of the information segment 216 to the first device 102. For specific example, if the carrier offers the 4G LTE network, the customization module 822 can increase the segment size 220 for the carrier type 224. For different example, if the user of the first device 102 travels abroad, and the carrier at the traveled location offers the 3G network, the customization module 822 can decrease the segment size 220 for the carrier type 224.

It has been discovered that the present invention can reduce the transaction time for displaying the information segment 216 on the display interface 202 by factoring the carrier type 224. The segment size 220 can be reduced if the carrier type 224 changes as the wireless service offered by the carrier is changed from 4G LTE network to 3G network. Subsequently, the burden on the communication path 104 for transmitting the information segment 216 can be reduced. As a result, the first device 102 can display the information segment 216 more quickly and efficiently for safer operation of the navigation system 100 or the vehicle.

For another example the customization module 822 can customize the segment size 220 based on the platform type 226 for improving the transmission speed 240 of the information segment 216 to the first device 102. For specific example, the customization module 822 can generate the information segment 216 with the segment size 220 suitable for the capacity offered by the first storage interface 724. If the user of the first device 102 changes the first device 102 from Platform A to Platform B, and the Platform B having more capacity, the customization module 822 can increase the segment size 220 to take advantage of the greater capacity of the first storage interface 724 for Platform B.

It has been discovered that the present invention can reduce the transaction time for displaying the information segment 216 on the display interface 202 by factoring the platform type 226. The segment size 220 can be reduced if the first storage interface 724 becomes smaller as the user of the first device 102 changed the platform type 226 of the first device 102. Subsequently, the burden on the first device 102 for processing the information segment 216 can be reduced. As a result, the first device 102 can display the information segment 216 more quickly and efficiently for safer operation of the navigation system 100 or the vehicle.

For different example, the customization module 822 can customize the segment size 220 based on the travel condition 238 for improving the transmission speed 240 of the information segment 216 to the first device 102. For specific example, the customization module 822 can generate the information segment 216 with the segment size 220 that is larger in the rural geographic area than the urban geographic area. For example, the rural geographic area can be a geographic area where the population is sparse. More specifically, the rural geographic area may not require quicker update of the navigation information 206. Moreover, the navigation information 206 may contain less data for the rural geographic area. As a result, the segment generator module 820 may not require to segment the navigation information 206 frequently. The customization module 822 can generate the information segment 216 with the greater of the segment size 220 as the demand to update the navigation information 206 is less frequent in the rural geographic area.

It has been discovered that the present invention can reduce the transaction time for displaying the information segment 216 on the display interface 202 by factoring the travel condition 238. The segment size 220 can be reduced if the displaying of the information segment 216 warrants a quicker display due to the travel condition 238. For example, in an urban geographic area, the user of the first device 102 can desire the update on the display 202 for the information segment 216 more quickly and efficiently than if the user was traveling in the rural geographic area. By generating the information segment 216 with the segment size 220 that is reduced, the first device 102 can update the display more quickly and efficiently. As a result, the first device 102 can display the information segment 216 more quickly and efficiently for safer operation of the navigation system 100 or the vehicle.

For another example, the customization module 822 can customize the segment size 220 based on the information size 214 for improving the transmission speed 240 of the information segment 216 to the first device 102. For specific example, if the information size 214 of the navigation information 206 is greater than the capacity that the first storage interface 724 can handle, the customization module 822 can generate the information segment 216 with the segment size 220 based on a capacity size that the first storage interface 724 can handle.

The segment generator module 820 includes a subsegmentation module 824. The subsegmentation module 824 can generate the subsegment 228 of FIG. 2 similarly as the customization module 822. More specifically, the data size of the subsegment 228 after segmenting the information segment 216 can base on the similar factors as determining the segment size 220 of the information segment 216. For example, the subsegmentation module 824 can generate the subsegment 228 for further segmenting the information segment 216 for improving the transmission speed 240 of the information segment 216 to the first device 102.

It has been discovered that the present invention can reduce the transaction time for displaying the information segment 216 on the display interface 202 by generating the subsegment 228. The burden on the communication path 104 for transmitting the information segment 216 can be reduced by sending the smaller size of the subsegment 228. As a result, the first device 102 can display the information segment 216 more quickly and efficiently for safer operation of the navigation system 100 or the vehicle.

For illustrative purposes, the navigation system 100 is shown with the customization module 822 increasing or decreasing the segment size 220 of the information segment 216, although it is understood that the customization module 822 can be operated differently. For example, the customization module 822 can increase or decrease the segment size 200 based on including or excluding the subsegment 228.

For specific example, the information type 230 of the information segment 216 can represent the map information. The map information can include the plurality of the subsegment 228 representing the sign portion and the road portion. The customization module 822 can increase the segment size 220 by having both of the sign portion and the road portion as part of the information segment 216. In contrast, the customization module 822 can decrease the segment size 220 by only including the sign portion for the information segment 216.

The navigation system 100 can include a prioritizer module 826, which can be coupled to the segment generator module 820. The prioritizer module 826 prioritizes which of the information type 230 of the information segment 216 should be transmitted as a priority to the first device 102. For example, the prioritizer module 826 can prioritize the information type 230 for transmitting the information segment 216 to the first device 102.

The prioritizer module 826 can prioritize in a number of ways. For example, the prioritizer module 826 can prioritize the information type 230 based on the user's preference 236. For specific example, the user's preference 236 can indicate that the user of the first device 102 can desire that he or she would like to have the information type 230 representing the traffic information during the morning commute. The prioritizer module 826 can prioritize the transmission of the information segment 216 representing the traffic information first based on the user's preference 236.

For different example, the prioritizer module 826 can prioritize the information type 230 based on the network quality 222. More specifically, if the network quality 222 fails to meet the quality threshold 242, the prioritizer module 826 can prioritize the transmission of the information segment 216 with the smaller of the segment size 220 over other of the information segment 216 with the larger of the segment size 220. For specific example, the plurality of the information type 230 for the information segment 216 can include the route information and the map information. The map information can be larger of the segment size 220 than that of the route information. The network quality 222 can be below the quality threshold 242. The prioritizer module 826 can prioritize the information type 230 for the route information to be transmitted prior to transmitting the information segment 216 based on the network quality 222.

For another example, the prioritizer module 826 can prioritize the information type 230 based on the carrier type 224. If Carrier A offers the 4G LTE network for the communication path 104, the prioritizer module 826 can prioritize the transmission of the information type 230 with a large data size. More specifically, the information type 230 for the map information can represent the large data size, as the information segment 216 can include the plurality of the subsegment 228, such as the road name information and the sign information. If the communication path 104 is 4G LTE network compliant, because of the larger bandwidth than the 3G network, the prioritizer module 826 can prioritize the transmission of the information type 230 having the segment size 220 that is large.

For different example, the prioritizer module 826 can prioritize the information type 230 based on the platform type 226. For specific example, the first device 102 can represent Platform A. For further example, the first control unit 712 of FIG. 7 can process the graphics information of the map information better than Platform B. As a result, the prioritizer module 826 can give a higher priority for the second device 106 to transmit the information type 230 of map information based on the platform type 226. More specifically, the prioritizer module 826 can allow the map information to be transmitted first to the first device 102 with the platform type 226 of Platform A than if the platform type 226 of Platform B.

It has been discovered that the present invention can reduce the transaction time for displaying the information segment 216 on the display interface 202 by prioritizing the information type 230. The prioritization of the information type 230 improve the transaction time for displaying the information segment 216 on the first device 102 by transmitting the information type 230 with the smaller of the information segment 216 more quickly and efficiently prior to transmitting the information segment 216 with the larger of the segment size 220. As a result, the first device 102 can display the information segment 216 efficiently for safer operation of the navigation system 100 or the vehicle.

The navigation system 100 can include a combination module 828, which can be coupled to the prioritizer module 826. The combination module 828 combines the plurality of the information segment 216. More specifically, the combination module 828 can combine a plurality of the information type 230 to generate the segment combination 232 of FIG. 2. For example, the combination module 828 can generate the segment combination 232 based on combining the plurality of the information segment 216 for customizing the navigation information 206 displayed on the first device 102.

The combination module 828 can generate the segment combination 232 in a number of ways. For example, the combination module 828 can generate the segment combination 232 based on the user's preference 236. The user's preference 236 can desire to always have the plurality of the information type 230 representing the route information and the audio information. The combination module 828 can generate the segment combination 232 having the plurality of the information segment 216 representing the route information and the audio information.

It has been discovered that the present invention can enhance the safe operation of the navigation system 100 by generating the combination of the information segment 216 desired by the user's preference 236. The segment combination 232 can include the information type 230 most pertinent to the user of the first device 102. As a result, the first device 102 can display the information segment 216 most relevant to the user for safer operation of the navigation system 100 or the vehicle.

For different example, the combination module 828 can generate the segment combination 232 based on the network quality 222. For specific example, the generation of the segment combination 232 can differ based on how much below the network quality 222 compared is to the quality threshold 242. If the strength of the wireless signal is only 1% decibel below the quality threshold 242, the combination module 828 can generate the segment combination 232 having five of the information segment 216. In contrast, if the strength of the wireless signal is 20% decibel below the quality threshold 242, the combination module 828 can generate the segment combination 232 having two of the information segment 216. More specifically, the two of the information segment 216 can represent the information segment 216 having smallest of the data size out of the five of the information segment 216.

It has been discovered that the present invention can reduce a transaction time for displaying the segment combination 232 on the display interface 202 by factoring the network quality 222. The combination of the segment combination 232 can be altered if the network quality 222 dips below the quality threshold 242. Subsequently, the burden on the communication path 104 for transmitting the segment combination 232 can be reduced. As a result, the first device 102 can display the segment combination 232 more quickly and efficiently for safer operation of the navigation system 100 or the vehicle.

The navigation system 100 can include a sequence generator module 830. The sequence generator module 830 generates the transmission sequence 234 of FIG. 2. For example, the sequence generator module 830 can generate the transmission sequence 234 for prioritizing the information type 230 of the information segment 216 for displaying the information segment 216 on the first device 102.

The sequence generator module 830 can generate the transmission sequence 234 in a number of ways. For example, the sequence generator module 830 can generate the transmission sequence 234 based on the prioritization of the information type 230 generated by the prioritizer module 826. For specific example, if the prioritizer module 826 designated the information type 230 of the route information as the highest priority, the sequence generator module 830 can generate the transmission sequence 234 with the route information as first of the information segment 216 to be transmitted.

For different example, the sequence generator module 830 includes a variety module 832. The variety module 832 can generate the variation 302 of FIG. 3 of the transmission sequence 234. For example, the variety module 832 can dynamically generate the variation 302 of the transmission sequence 234 based on various factors.

For specific example, the variety module 832 can generate the variation 302 based on the network quality 222. As the user of the first device 102 travels along the travel route 212, the distance between the first device 102 and the cell tower can change. The network quality 222 can change as the wireless signal strength can change based on the current location 210 relative to the cell tower. Based on the changes of the network quality 222, the variety module 832 can generate the variation 302 to rearrange the transmission sequence 234.

More specifically, the map information can represent the largest of the data size compared to the route information or the audio information. If the wireless signal strength is 1% below the quality threshold 242, the sequence generator module 830 can generate the transmission sequence 234 with the information type 230 in the order of the map information, the route information, and the audio information. The map information can still be sent first, as the wireless signal strength only dropped 1% below the quality threshold 242.

In contrast, if the wireless signal strength drops 10% below the quality threshold 242, the variety module 832 can rearrange the transmission sequence 234 in the order of the route information, the audio information, and the map information. The rearrangement of the transmission sequence 234 allows the transmission of the information segment 216 having the smaller of the segment size 220 before the bigger of the segment size 220 to avoid network latency due to clogging of the communication path 104 with the bigger data size.

It has been discovered that the present invention can reduce a transaction time for displaying the information segment 216 on the display interface 202 based on rearranging the transmission sequence 234 by factoring the network quality 222. The transmission sequence 234 can be rearranged if the network quality 222 dips below the quality threshold 242. Subsequently, the burden on the communication path 104 for transmitting the information segment 216 can be reduced. As a result, the first device 102 can display the information segment 216 more quickly and efficiently for safer operation of the navigation system 100 or the vehicle.

For different example, the variety module 832 can generate the variation 302 based on the travel condition 238. For example, the variety module 832 can update the transmission sequence 234 based on the travel condition 238 for rearranging the information segment 216 for transmitting the information segment 216 to the first device 102.

If the travel condition 238 for traversing along the travel route 212 is sunny and dry, the sequence generator module 830 can generate the transmission sequence 234 in the order of the route information, the map information, and the road condition information. In contrast, if the travel condition 238 changes to rainy and wet condition, the variety module 832 can rearrange the transmission sequence 234 in the order of the route information, the road condition information, and the map information. The information segment 216 representing the road condition information can be transmitted before the information segment 216 representing the map information, as the user of the first device 102 can desire the road condition information more when the road condition for the travel route 212 deteriorates.

It has been discovered that the present invention can display the information segment 216 on the display interface 202 most pertinent to the user of the first device 102 based on rearranging the transmission sequence 234 by factoring the travel condition 238. The transmission sequence 234 can be rearranged as the travel condition 238 changes from traversing the travel route 212. As a result, the first device 102 can display the information segment 216 based on the travel condition 238 more quickly and efficiently for safer operation of the navigation system 100 or the vehicle.

For another example, the variety module 832 can generate the variation 302 based on the user's preference 236. For example, the variety module 832 can update the transmission sequence 234 based on the user's preference 236 for rearranging the information segment 216 for transmitting the information segment 216 to the first device 102. More specifically, even if the wireless signal strength dips below the quality threshold 242, the user of first device 102 can desire the segment combination 232 of the plurality of the information segment 216 representing the route information and the audio information to be always be simultaneously transmitted first to the first device 102. The variety module 832 can generate the variation 302 based on the user's preference 236 to include the segment combination 232 of the route information and the audio information.

It has been discovered that the present invention can display the information segment 216 on the display interface 202 most pertinent to the user of the first device 102 based on rearranging the transmission sequence 234 by factoring the user's preference 236. The transmission sequence 234 can be rearranged to transmit the information segment 216 most desired by the user. As a result, the first device 102 can display the information segment 216 that is most pertinent to the user more quickly and efficiently for safer operation of the navigation system 100 or the vehicle.

The navigation system 100 can include a display module 834, which can be coupled to the sequence generator module 830. The display module 834 displays the information segment 216 on the first device 102. For example, the display module 834 can display the information segment 216 based on the transmission sequence 234 generated by the second device 106.

The display module 834 can display the information segment 216 in a number of ways. For example, the display module 834 can display the information segment 216 in the order specified on the transmission sequence 234. More specifically, the display module 834 can display the information segment 216 as the display module 834 receives the information segment 216. For different example, in contrast, the display module 834 can display the navigation information 206 after all of the information segment 216 have been transmitted to the first device 102.

It has been discovered that the present invention can display the information segment 216 on the display interface 202 more quickly by displaying the information segment 216 in the order the first device 102 received. The first device 102 can display the portion of the navigation information 206 as soon as it receives rather than waiting for the entire data set for the navigation information 206 to be downloaded. As a result, the first device 102 can display the information segment 216 more quickly and efficiently for safer operation of the navigation system 100 or the vehicle.

The physical transformation from traveling along the travel route 212 results in movement in the physical world, such as people using the first device 102, the vehicle, or a combination thereof, based on the operation of the navigation system 100. As the movement in the physical world occurs, the movement itself creates additional information that is converted back into the segment size 220, the transmission sequence 234, the variation 302, or a combination thereof for the continued operation of the navigation system 100 and to continue the movement in the physical world.

The first software 726 of FIG. 7 of the first device 102 of FIG. 7 can include the navigation system 100. For example, the first software 726 can include the receiver module 802, the navigation generator module 804, the factor module 806, the segment generator module 820, the prioritizer module 826, the combination module 828, the sequence generator module 830, and the display module 834.

The first control unit 712 of FIG. 7 can execute the first software 726 for the receiver module 802 to receive the navigation request 204. The first control unit 712 can execute the first software 726 for the navigation generator module 804 to generate the navigation information 206. The first control unit 712 can execute the first software 726 for the factor module 806 to determine the network quality 222, the carrier type 224, the platform type 226, the user's preference 236, the travel condition 238, the information size 214, or a combination thereof. The first control unit 712 can execute the first software 726 for the segment generator module 820 to generate the information segment 216.

The first control unit 712 can execute the first software 726 for the prioritizer module 826 to prioritize the information type 230. The first control unit 712 can execute the first software 726 for the combination module 828 to generate the segment combination 232. The first control unit 712 can execute the first software 726 for the sequence generator module 830 to generate the transmission sequence 234. The first control unit 712 can execute the first software 726 for the display module 834 to display the information segment 216.

The second software 742 of FIG. 7 of the second device 106 of FIG. 7 can include the navigation system 100. For example, the second software 742 can include the receiver module 802, the navigation generator module 804, the factor module 806, the segment generator module 820, the prioritizer module 826, the combination module 828, the sequence generator module 830, and the display module 834.

The second control unit 734 of FIG. 7 can execute the second software 742 for the receiver module 802 to receive the navigation request 204. The second control unit 734 can execute the second software 742 for the navigation generator module 804 to generate the navigation information 206. The second control unit 734 can execute the second software 742 for the factor module 806 to determine the network quality 222, the carrier type 224, the platform type 226, the user's preference 236, the travel condition 238, the information size 214, or a combination thereof.

The second control unit 734 can execute the second software 742 for the segment generator module 820 to generate the information segment 216. The second control unit 734 can execute the second software 742 for the prioritizer module 826 to prioritize the information type 230.

The second control unit 734 can execute the second software 742 for the combination module 828 to generate the segment combination 232. The second control unit 734 can execute the second software 742 for the sequence generator module 830 to generate the transmission sequence 234. The second control unit 734 can execute the second software 742 for the display module 834 to display the information segment 216.

The navigation system 100 can be partitioned between the first software 726 and the second software 742. For example, the second software 742 can include the navigation generator module 804, the factor module 806, the segment generator module 820, the prioritizer module 826, the combination module 828, and the sequence generator module 830. The second control unit 734 can execute modules partitioned on the second software 742 as previously described.

The first software 726 can include the receiver module 802 and the display module 834. Based on the size of the first storage unit 714 of FIG. 7, the first software 726 can include additional modules of the navigation system 100. The first control unit 712 can execute the modules partitioned on the first software 726 as previously described.

The first control unit 712 can operate the first communication unit 716 of FIG. 7 to communicate the navigation request 204, the transmission sequence 234, or a combination thereof to or from the second device 106. The first control unit 712 can operate the first software 726 to operate the location unit 720 of FIG. 7. The second communication unit 736 of FIG. 7 can communicate the information segment 216 in the order specified in the transmission sequence 234 to or from the first device 102 through the communication path 104 of FIG. 7.

The navigation system 100 describes the module functions or order as an example. The modules can be partitioned differently. For example, prioritizer module 826 and the combination module 828 can be combined. Each of the modules can operate individually and independently of the other modules.

Furthermore, data generated in one module can be used by another module without being directly coupled to each other. For example, the prioritizer module 826 can receive the travel condition 238 from the factor module 806. The receiver module 802, the navigation generator module 804, the factor module 806, the segment generator module 820, the prioritizer module 826, the combination module 828, the sequence generator module 830, and the display module 834 can be implemented in as hardware accelerators (not shown) within the first control unit 712 or the second control unit 734, or can be implemented in as hardware accelerators (not shown) in the first device 102 or the second device 106 outside of the first control unit 712 or the second control unit 734.

The modules described in this application can be hardware implementation or hardware accelerators in the first control unit 712 or in the second control unit 734. The modules can also be hardware implementation or hardware accelerators within the first device 102 or the second device 106 but outside of the first control unit 712 or the second control unit 734, respectively as depicted in FIG. 7. However, it is understood that the first control unit 712, the second control unit 734, or a combination thereof can collectively refer to all hardware accelerators for the modules.

The modules described in this application can be implemented as instructions stored on a non-transitory computer readable medium to be executed by the first control unit 712, the second control unit 734, or a combination thereof. The non-transitory computer medium can include the first storage unit 714 of FIG. 7, the second storage unit 746 of FIG. 7, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 9:
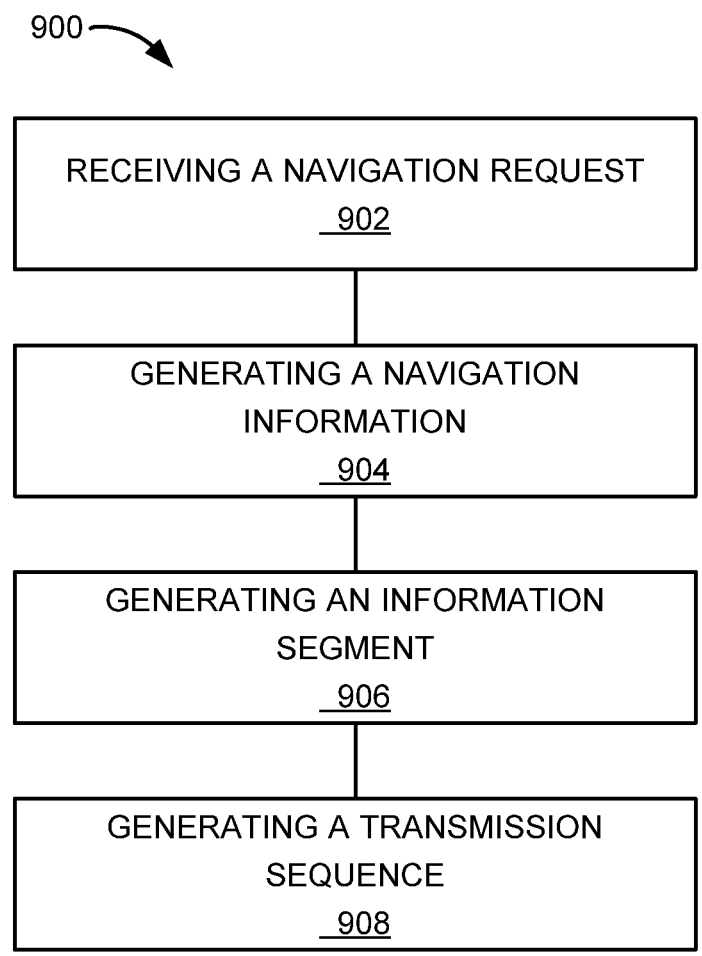
FIG. 9 is a flow chart of a method of operation of the navigation system of FIG. 1 in a further embodiment of the present invention.

Referring now to FIG. 9, therein is shown a flow chart of a method 900 of operation of the navigation system 100 of FIG. 1 in a further embodiment of the present invention. The method 900 includes: receiving a navigation request for reaching a destination in a block 902; generating a navigation information based on the navigation request in a block 904; generating an information segment from the navigation information in a block 906; and generating a transmission sequence for prioritizing an information type of the information segment for displaying the information segment on a device in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving a navigation request for reaching a destination;
   generating a navigation information with a control unit based on the navigation request;
   generating multiple instances of an information segment including various instances of a segment size from the navigation information;
   prioritizing an information type representing a smaller of the segment size to be transmitted prior to the information type having a larger of the segment size based on a network quality below a quality threshold;
   generating a transmission sequence for prioritizing the information type of the information segment; and
   transmitting the information segment in accordance with the transmission sequence for displaying the information segment on a device.

2. The method as claimed in claim 1 further comprising:
   updating the transmission sequence based on a travel condition; and wherein:
   updating the transmission sequence includes rearranging the information segment for transmitting the information segment to the device.

3. The method as claimed in claim 1 further comprising:
   updating the transmission sequence based on a user's preference; and wherein:
   updating the transmission sequence includes rearranging the information segment for transmitting the information segment to the device.

4. The method as claimed in claim 1 further comprising generating a segment combination based on combining a plurality of the information segment for customizing the navigation information displayed on the device.

5. The method as claimed in claim 1 further comprising prioritizing the information type for transmitting the information segment to the device.

6. A method of operation of a navigation system comprising:
   receiving a navigation request for reaching a destination;
   generating a navigation information with a control unit based on the navigation request;
   generating multiple instances of an information segment including various instances of a segment size based on segmenting the navigation information;
   prioritizing an information type representing a smaller of the segment size to be transmitted prior to the information type having a larger of the segment size based on a network quality below a quality threshold for transmitting the information segment to a device;
   generating a transmission sequence based on the information type; and
   transmitting the information segment in accordance with the transmission sequence for displaying the information segment on the device.

7. The method as claimed in claim 6 wherein generating the information segment includes generating a subsegment for further segmenting the information segment for improving a transmission speed of the information segment to the device.

8. The method as claimed in claim 6 wherein generating the information segment includes customizing the segment size of the information segment based on a platform type for improving a transmission speed of the information segment to the device.

9. The method as claimed in claim 6 wherein generating the information segment includes customizing the segment size of the information segment based on a carrier type for improving a transmission speed of the information segment to the device.

10. The method as claimed in claim 6 wherein generating the information segment includes customizing the segment size of the information segment based on the network quality for improving a transmission speed of the information segment to the device.

11. A navigation system comprising:
a control unit for:
receiving a navigation request for reaching a destination,
generating a navigation information based on the navigation request,
generating multiple instances of an information segment including various instances of a segment size from the navigation information,
prioritizing an information type representing a smaller of the segment size to be transmitted prior to the information type having a larger of the segment size based on a network quality below a quality threshold,
generating a transmission sequence for prioritizing the information type of the information segment, and
a communication unit, coupled to the control unit, for transmitting the information segment in accordance with the transmission sequence for displaying on a device.

12. The system as claimed in claim 11 wherein the control unit is for updating the transmission sequence based on a travel condition for rearranging the information segment for transmitting the information segment to the device.

13. The system as claimed in claim 11 wherein the control unit is for updating the transmission sequence based on a user's preference for rearranging the information segment for transmitting the information segment to the device.

14. The system as claimed in claim 11 wherein the control unit is for generating a segment combination based on combining a plurality of the information segment for customizing the navigation information displayed on the device.

15. The system as claimed in claim 11 wherein the control unit is for prioritizing the information type for transmitting the information segment to the device.

16. The system as claimed in claim 11 wherein the control unit is for:
prioritizing the information type for transmitting the information segment to the device; and
generating a transmission sequence based on the information type for displaying the information segment on the device.

17. The system as claimed in claim 16 wherein the control unit is for generating a subsegment for further segmenting the information segment for improving a transmission speed of the information segment to the device.

18. The system as claimed in claim 16 wherein the control unit is for customizing the segment size of the information segment based on a platform type for improving a transmission speed of the information segment to the device.

19. The system as claimed in claim 16 wherein the control unit is for customizing the segment size of the information segment based on a carrier type for improving a transmission speed of the information segment to the device.

20. The system as claimed in claim 16 wherein the control unit is for customizing the segment size of the information segment based on the network quality for improving a transmission speed of the information segment to the device.

* * * * *